United States Patent [19]

Fujino et al.

[11] Patent Number: 5,005,047
[45] Date of Patent: Apr. 2, 1991

[54] CAMERA DATA SETTING DEVICE

[75] Inventors: Akihiko Fujino, Osaka; Manabu Inoue, Kobe; Takanobu Omaki, Osaka; Masaaki Nakai, Osaka; Akira Fujii, Osaka; Minoru Sekida, Osaka, all of Japan

[73] Assignee: Minolta Camera Kabushiki Kaisha, Osaka, Japan

[21] Appl. No.: 489,881

[22] Filed: Mar. 7, 1990

Related U.S. Application Data

[63] Continuation of Ser. No. 388,316, Aug. 1, 1989, abandoned, which is a continuation of Ser. No. 115,620, Oct. 30, 1987, abandoned, which is a continuation of Ser. No. 807,694, Dec. 11, 1985, abandoned.

[30] Foreign Application Priority Data

Dec. 14, 1984 [JP] Japan .............. 59-190602[U]
Dec. 14, 1984 [JP] Japan .............. 59-190603[U]
Dec. 17, 1984 [JP] Japan .............. 59-191074[U]

[51] Int. Cl.$^5$ .................. G03B 17/18; G03B 7/097
[52] U.S. Cl. .................. 354/442; 354/289.12
[58] Field of Search .............. 354/441, 442, 443, 288, 354/289.1, 289.12, 270

[56] References Cited

U.S. PATENT DOCUMENTS

| 4,011,569 | 3/1977 | Mashimo et al. | 354/442 |
|---|---|---|---|
| 4,063,260 | 12/1977 | Toyishima | 354/270 X |
| 4,253,756 | 3/1981 | Kurei et al. | 354/442 X |
| 4,286,849 | 9/1981 | Uchidoi et al. | 354/442 |
| 4,295,716 | 10/1981 | Numata | 354/442 |
| 4,304,472 | 12/1981 | Shinoda et al. | 354/442 X |
| 4,420,240 | 12/1983 | Katsuma et al. | 358/288 |
| 4,529,291 | 7/1985 | Miyogui | 354/289.1 |
| 4,571,049 | 2/1986 | Tsunefuji et al. | 354/441 X |
| 4,598,986 | 7/1986 | Shiratori et al. | 354/289.1 X |
| 4,621,914 | 11/1986 | Taniguchi et al. | 354/475 |
| 4,688,922 | 8/1987 | Furuya et al. | 354/441 |

FOREIGN PATENT DOCUMENTS

764930 1/1957 United Kingdom .............. 354/270

Primary Examiner—W. B. Perkey
Attorney, Agent, or Firm—Watson, Cole, Grindle & Watson

[57] ABSTRACT

A camera exposure data setting device for setting exposure data in digital form in response to [on or off] of switches. A first switch actuating member is manually operable for changing mainly an exposure time value and is located at or about the position where a shutter speed setting dial is located in conventional cameras, and a second switch actuating member is manually operable for changing mainly a diaphragm aperture value and is located at a position of the camera opposite from the position of the first switch member with respect to the vertical plane passing through the optical axis of an objective lens. The first switch; actuating member is operated for changing the exposure time value in an exposure time priority automatic exposure control mode and a manual exposure control mode and changing the diaphragm aperture value in a diaphragm aperture priority automatic exposure control mode, and the second switch; actuating member is operated for changing the exposure time value in the exposure time priority automatic exposure control mode and the diaphragm aperture value in the exposure time priority automatic exposure control mode and the manual exposure control mode.

11 Claims, 7 Drawing Sheets

CAMERA DATA SETTING DEVICE

This application is a continuation of application Ser. No. 388,318, filed Aug. 1, 1989 now abandoned, which is a continuation of application Ser. No. 115,620, filed 10/30/87, which is a File Wrapper continuation application of application Ser. No. 807,694, filed 12/11/85, both abandoned.

BACKGROUND OF THE INVENTION

1. Field of the Invention

The present invention relates to a camera data setting device which includes switch members manually operated for setting camera data such as a shutter speed value, a diaphragm aperture value, and an exposure compensation value, and which is used for a camera operable selectively in a plurality of exposure control modes such as a programmed automatic exposure control mode (hereinafter referred to as P mode), a diaphragm aperture priority automatic exposure control mode (hereinafter referred to as A mode), an exposure time priority automatic exposure control mode (hereinafter referred to as S mode), and a manual exposure control mode (hereinafter referred to as M mode).

2. Description of the Prior Art

A camera data setting device of the above mentioned type is disclosed in a Japanese laid open patent application with the laid open No. 54-138431. The device of the laid-open application is used for a camera which operates selectively in the A and S modes and is provided with a pair of switch members, one for the increase of the camera data and the other for the decrease of the camera data. Both switch members are commonly used for changing the diaphragm aperture value in the A mode and the exposure time in the S mode. However, the camera of the application operates only in the A and S modes and cannot operate in a M mode.

If the switch member of the prior art camera is adapted for the exposure data setting in the M mode as well as in the A and S modes, a selector member is required for the selection of the exposure data to be changed in the M mode between the diaphragm aperture and exposure time such that the switch members can change both exposure data selectively. The selector member may only be used for the data change in the M mode. Additionally, in the M mode, the user, before operating the switch members, must confirm which data has been selected to be changed. After changing the selected data, he or she must then operate the selector member to select the other data and operate the switch members. Thus, the operation is complicated and annoying for the user. Otherwise, it is likely to occur that unexpected data is changed if the user fails to confirm the selection of the exposure data.

Furthermore, both switch members are arranged on the left side of the camera top cover, as viewed from the back of the camera. However, when the user holds the camera with the right hand grasping the right side of the camera body and with the left hand supporting the lower side of the lens barrel as viewed from the back of the camera, it is difficult for him or her to operate the switch members without moving either hand off the camera or to reach to the switch member with a finger of either hand holding the camera. Additionally, as the location of the switch members is different from that of a diaphragm aperture setting dial and a shutter speed setting dial on the conventional cameras, unusual or strange feeling of operation is caused to the user who has been accustomed to the operation of the conventional camera.

SUMMARY OF THE INVENTION

It is an object of the invention to provide a camera data setting device which can be easily operated without failure.

Another object of the present invention is to provide a camera with manual members arranged to be operated simply without confusion for turning on or off switches and changing exposure data set in digital form.

A further object of the present invention is to provide a camera data setting device which includes switch members manually operable for changing a diaphragm aperture value and an exposure time value and which will not cause strange and unusual feeling of data changing operation to the users who have been accustomed to the operation of conventional cameras having a diaphragm aperture setting ring and shutter speed setting dial.

Still a further object of the present invention is to provide a camera data setting device which includes switch members manually operable for changing a diaphragm aperture value and an exposure time value in A, S and M modes without requiring complicated operation for the selection of the data to be operated.

An even further object of the present invention is to provide a camera which includes switch members manually operable for changing a diaphragm aperture value and an exposure time value and easily accessible by the user who holds the camera with both hands.

An additional object of the present invention is to provide a camera data setting device wherein modified or shifted camera condition and data are restored to basic standard ones in a short time.

A camera data setting device according to the present invention is provided with first and second switch members manually operable for changing the camera data and located at different positions on the camera. The first switch member is located at or near a portion of the camera where a shutter speed setting dial is located on a conventional camera and the second switch member is located at a position opposite from the position of the first switch member with respect to the vertical plane passing the optical axis of the camera objective lens. Moreover, the first switch member is used for changing the exposure time in the S and M modes and changing the diaphragm aperture in the A mode, and the second switch member is used for changing the exposure time in the S mode and changing the diaphragm aperture in the A and M modes.

Accordingly, although the first and second switch members are separately located for data change in the M mode, both switch members are commonly used in the S and A modes for changing the value of the exposure time or diaphragm aperture and making the data changing operation easy. Additionally both switch members can be operated with the camera held in both hands of a user, such that the first switch member is operable by a finger of the right hand which grasps the camera body and the second switch member is operable by the thumb or finger of the left hand which supports the lens barrel. In other words, the data change according to the present invention is carried out substantially in the same manner as in the data change in the conventional mechanical setting type camera.

These and other objects and advantages of the invention will become more apparent upon a reading of the following detailed specification and drawings.

DETAILED DESCRIPTION OF A PREFERRED EMBODIMENT

Figure 1:
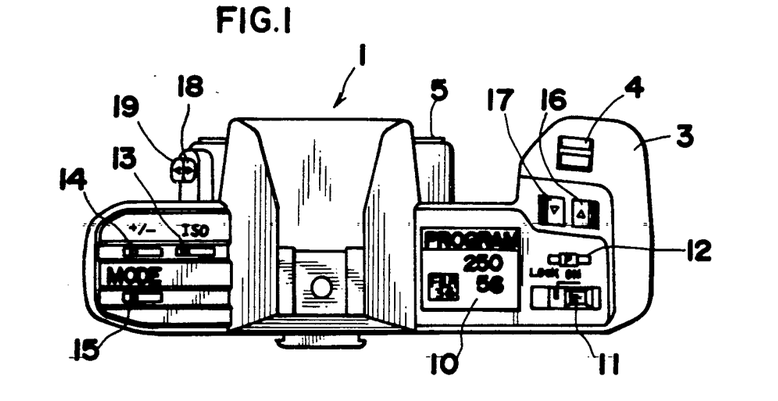
FIG. 1 is a top plan view of a camera to which the present invention is applied.
Figure 2:
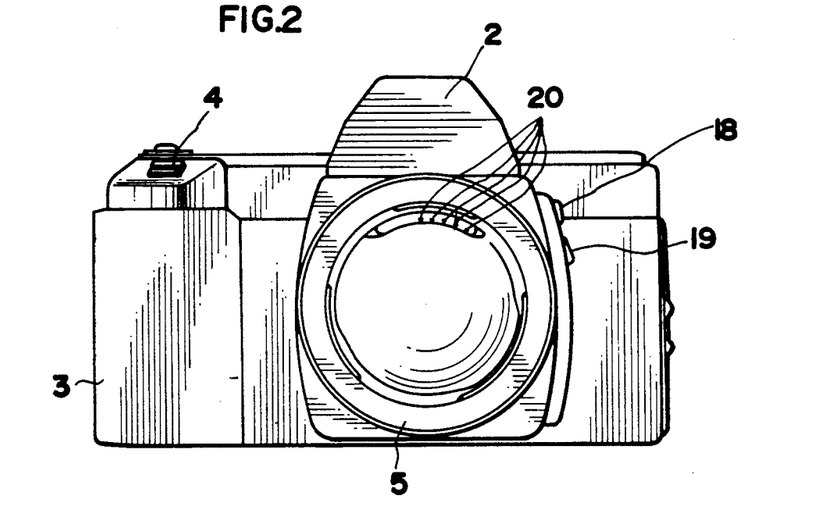
FIG. 2 is a front elevation of the camera shown in FIG. 1.
Figure 3:
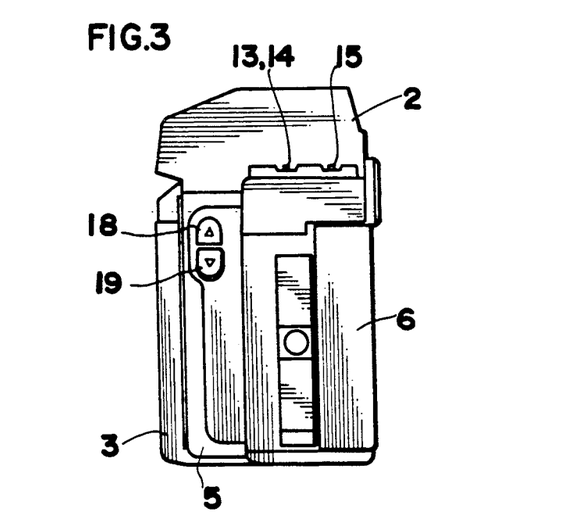
FIG. 3 is a right side view of the camera shown in FIG. 1.

FIGS. 1 through 3 show the outer appearance of an example of a lens-exchangeable single lens reflex camera to which the present invention is applied. FIG. 1 is a top plan view of the camera, while FIGS. 2 and 3 are front elevation and right side views of the same. With reference to FIG. 1, the camera 1 is provided on the right side portion of its top cover 2, with a display section 10, a main switch member 11 and a reset pushbutton 12. The camera 1 is provided on the left side of the top cover 2, with three selector pushbuttons 13, 14 and 15. On the top of the camera holder grip 3 are provided a shutter button 4 and a first pair of photography data changing pushbuttons 16 and 17. A second pair of photography data changing pushbuttons 18 and 19 are provided on the side wall of the lens-supporting mount 5 on the side opposite from the camera holder grip 3. As seen in the figure, the camera according to the present embodiment is not provided with members such as a shutter dial, a film speed setting dial, an exposure compensation dial and an exposure control mode selection dial, which are adapted to mechanically setting photography data such as a shutter speed, a film speed, an amount of exposure compensation, and an exposure control mode. In the present embodiment of camera 1, the photography data are electrically set in response to the operation of the afore-mentioned selection buttons 13 through 15 and changing buttons 16 through 19.

The main switch member 11 is manually and alternatively moved to the "ON" position to allow camera operation and to the "LOCK" position to inhibit camera operation. The display section 10 is composed of an electro-optical display element such as a liquid crystal display device, and displays photography data such as the exposure control mode, the shutter speed, the diaphragm aperture value, the photograph frame number, the film speed and the amount of exposure compensation. The selector pushbuttons 13, 14 and 15 respectively correspond to the film speed setting dial, the exposure compensation setting dial and the exposure control mode selector dial provided on conventional cameras, and are manually operated to set the respective photography data in cooperation with the changing pushbuttons 16 or 17 which is manually operated while one of the selector pushbuttons is being depressed. The changing pushbuttons 16 and 17 correspond to the shutter dial of conventional cameras and are manually operated to mainly increase or reduce the set shutter speed when the shutter button 4 is operated or for the given time after the operation of the shutter button 4. When any one of the selector pushbuttons 13, 14 or 15 is being operated, the manual operation of the changing pushbutton 16 or 17 will change the photography data corresponding to the selector pushbutton being operated. Exchangeable lenses (not shown) to be coupled with the camera 1 of the present embodiment are not provided with any conventional diaphragm setting ring. Instead, the changing pushbuttons 18 and 19 correspond to the conventional diaphragm setting ring and are operated to mainly increase or reduce the set diaphragm value. The reset pushbutton 12 is manually operated to set predetermined photography data in the camera by overriding the photography data changed and set by the pushbuttons 13 through 19.

Figure 4:
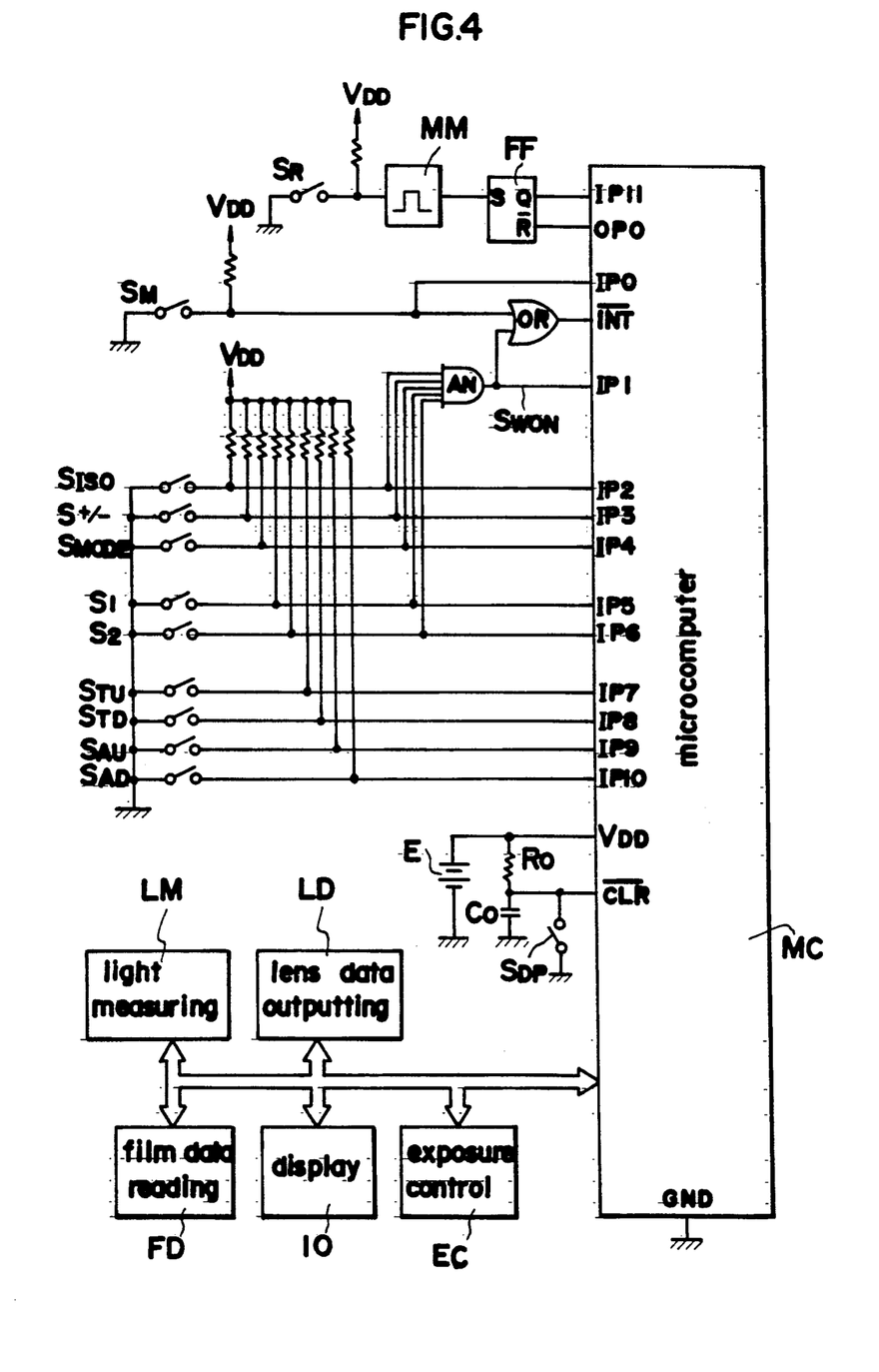
FIG. 4 is a circuit diagram of the camera shown in FIG. 1.

FIG. 4 shows the camera circuitry, mainly the circuit relating to data setting according to the present invention. With reference to the FIG., a microcomputer MC forms a control section which controls camera operations, such as light measurement, calculation, display, exposure control and so forth, in response to the closure of switches described later. A power-up clear circuit is composed of a resistor Ro connected across the positive power source terminal VDD and the clear terminal $\overline{CLR}$ of the microcomputer MC and a capacitor C0 connected across the clear terminal $\overline{CLR}$ and the ground terminal of the microcomputer MC. When a power source battery E is loaded in the camera 1, the power-up clear circuit inputs to the clear terminal a signal dropping to a "Low" level so that the later-described reset operation of the microcomputer is commenced. A switch SDP connected in parallel with the capacitor C0 is closed by the operation of the reset pushbutton 12 shown in FIG. 1. A switch SM is opened and closed by the operation of the main switch member 11 in FIG. 1 and is connected to the input terminal IP0 directly and to the interruption terminal INT through an OR gate OR. The microcomputer MC is interrupted when a signal dropping to a "low" level is input to the interruption terminal. Switches SISO, S+/− and SMODE connected to input terminals IP2, IP3 and IP4 respectively are normally open and are closed when the corresponding selector pushbutton 13, 14 or 15 is depressed. Switches S1 and S2 connected to input terminals IP5 and IP6, respectively, are a light-measurement commencing switch and shutter release switch respectively, which are closed at the initial and final stage of depression of the shutter button 4 shown in FIG. 1. Switches STU, STD, SAU and SAD are respectively, connected with input terminals IP7, IP8, IP9 and IP10, and are normally open and are closed when one of the corresponding changing pushbuttons 16, 17, 18 or 19 is depressed. An AND gate AN is applied at its input terminals with the opening/closure signals of the switches SISO, S+/−, SMODE, S1 and S2. The output terminal of the AND gate AN is connected to the input terminal IP1 directly and to the interruption terminal INT through OR gate OR. Furthermore, a switch SR is opened in response to the closure of the back cover 6 of the camera 1 and is connected to the S input terminal of a flip-flop FF through a one-shot circuit MM. The Q output terminal and the $\overline{R}$ input terminal of the flip-flop FF are connected with the IP11 input terminal and OP0 output terminal respectively, of the microcomputer MC.

A lens data outputting section LD is incorporated in the exchangeable lens and is composed of a ROM, which stores the data proper for the relevant exchangeable lens, and a circuit for outputting the data in the ROM. The lens proper data includes data of the fully open aperture value, the focal length and the like. Such lens data are transmitted to the microcomputer MC through the signal pins 20 (see FIG. 2) which are arranged on the camera 1 radially interior than the lens-receiving mount 5. A film data reading section FD reads the film data such as data of the film speed and possible picture frame number, and transmits them to the microcomputer MC. The film data are, for example, recorded on the cylindrical surface of the film cartridge in the form of a DX coded pattern. When the film cartridge with the DX coded pattern (hereinafter referred to as a DX film cartridge) is loaded in the camera, the film data reading section FD automatically reads the film data. A light-measuring section LM and an exposure control section EC of known type are also provided.

Figure 5:
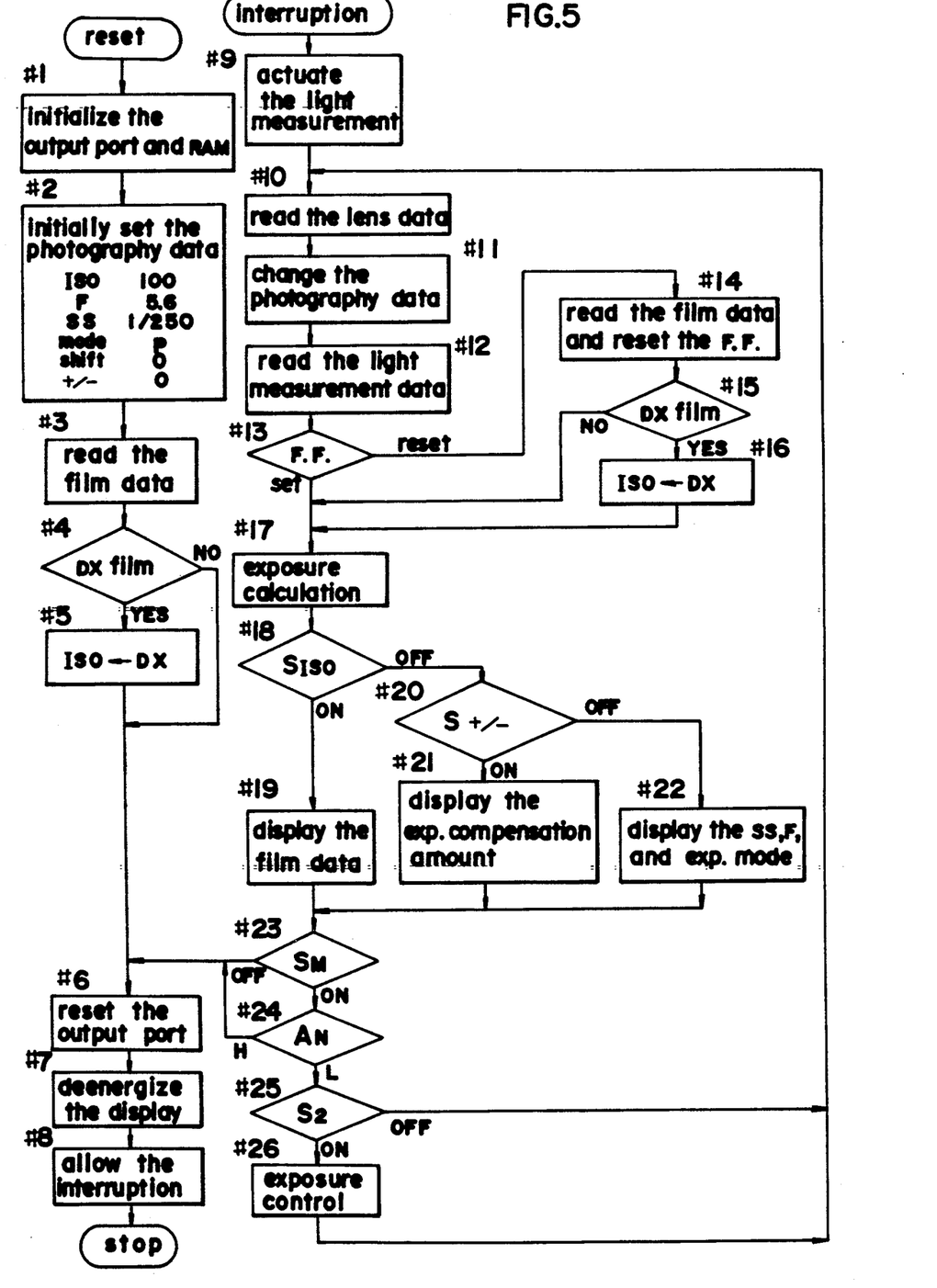
FIG. 5 is a flow chart showing the operation of the microcomputer shown in FIG. 4.

The operation of the camera with the above mentioned construction will be described mainly with respect to the process of the data setting with reference to the flow-chart shown in FIG. 5. It is to be noted that the camera of the embodiment is constructed to operate in five exposure control modes including programmed automatic exposure control mode (P-mode), the diaphragm aperture priority automatic exposure time control mode (A mode), the exposure time priority automatic diaphragm control mode (S mode) and the manual exposure control mode (as M mode). In the P mode, the program line can be varied or shifted at the user's will with an operation circuit or a microcomputer as described in Japanese laid-open patent application with a laid open No. 54-138431 and U.S. Pat. No. 4,320,944.

When the battery E is loaded in the camera, the power-up clear circuit operates to instantanously set the potential at the clear terminal to a "Low" level. In response to the dropping of the potential, the microcomputer MC performs the reset operation from the step #1. The photography data are initially set as IS0100 for the film speed, F5.6 for the diaphragm aperture, 1/250 for the shutter speed, P mode and 0 for the amount of program shifting, and 0 for the exposure compensation (#2). The film data reading section FD is actuated in step #3. In the case when a DX film cartridge with a DX coded pattern has been loaded in the camera and the film data reading section FD reads the film data on the cartridge, the read film speed data is stored at step #5. In the case when the coded pattern is not read because the film cartridge loaded in the camera has no DX coded pattern or if no film cartridge is loaded in the camera, the initialized film speed value corresponding to ISO 100 remains unchanged and the process proceeds to step #6. At step #6, the output port is reset, then the display section 10 is deenergized in step #7 and the microcomputer stops operating after making a condition to allow interruption by a "Low" level signal input to the interruption terminal $\overline{INT}$.

In the operation stop condition, the main switch member 11 may be shifted from the "LOCK" to the "ON" position to close the switch SM. If any one of the pushbuttons 13, 14 and 15 and the shutter button 4 is depressed in this condition, one of the switches SISO, S+/−, SMODE, S1 or S2 linked with the depressed button is closed to make the output of OR gate OR low and accordingly the input voltage to the interruption terminal so that the microcomputer is interrupted. With this interruption, the microcomputer MC starts operation beginning at step #9. First, the light-measuring section LM is actuated in step #9 and the lens data in the exchangeable lens is read from the lens data output section LD in step #10. Next, it is determined by the detection of potentials at terminals IP2 through IP6 whether any of switches SISO, S+/−, SMODE, S1 or S2 is closed, and photography data is changed in step #11 in accordance with the determination. The operation at the step #11 will be described in greater detail later.

It is then determined at step #13 whether or not the potential at the input terminal IP11 is at the "High" level, i.e., whether the flip-flop FF has been set or not. The flip-flop FF is arranged to be set once the camera back cover 6 is opened. Accordingly, it is detected at step #13 whether or not the camera back cover 6 has been opened and closed to exchange film after the film speed was initialized in steps #2 through #5. Hence, when the flip-flop has been set, it means that the film speed data has not been set since the film was exchanged, and the film data reading section FD is actuated at step #14 with the flip-flop FF being reset. Once the film data has been read, new film speed data is set at steps #15 and #16 and operation proceeds to step #17. If no film data has been read or if the flip-flop FF has been reset, the film speed data is left unchanged and the operation proceeds to step #17.

At step #17, the desired exposure value is calculated on basis of the photography data such as the exposure control mode, the diaphragm aperture value, the shutter speed value, and the light measurement data and so on. Then, it is detected again at which of the input terminals IP2 through IP6 the potential is a "Low" level. When the switch SISO has been closed, the film speed data is displayed in the display section 10 (steps #18 and #19). When the switch S+/− has been closed, the exposure compensation data is displayed (steps #20 and #21). When one of the switches SMODE, S1 and S1 has been set, the photography data of the aperture value or the shutter speed calculated at step #17 and the exposure control mode are dislayed (step 22). After that, it is determined at steps #23 and #24 whether the potentials at both input terminals IP0 and IP1 are "Low" levels or not, i.e. whether the switch SM has been closed with any of switches SISO, S+/−, SMODE, S1 and S2 having been closed. If the switch SM is open or all the switches SISO, S+/−, SMODE, S1 and S2 are open, the operation returns to the flow beginning at step #6 to be stopped after the display is deenergized and the interruption is allowed. When the switch SM has been closed and at the same time any of the switches SISO, S+/−, SMODE, S1 and S2 has been closed as in the case of the interruption, it is then determined at step #25 whether the switch S2 has been closed. If the switch S2 has been closed, a well known shutter release operation is initiated and exposure control operation is effected at step #26. After that, the operation returns back to step #10. When the switch S2 is open, the operation immediately returns to the step #10. Then, the aforementioned operations of light measurement, exposure calculation and display operations over the steps #10 through #22 are restarted. This operation is repeated until the switch SM is opened or all the switches SISO, S+/−, SMODE, S1 and S2 are opened.

Figure 6:
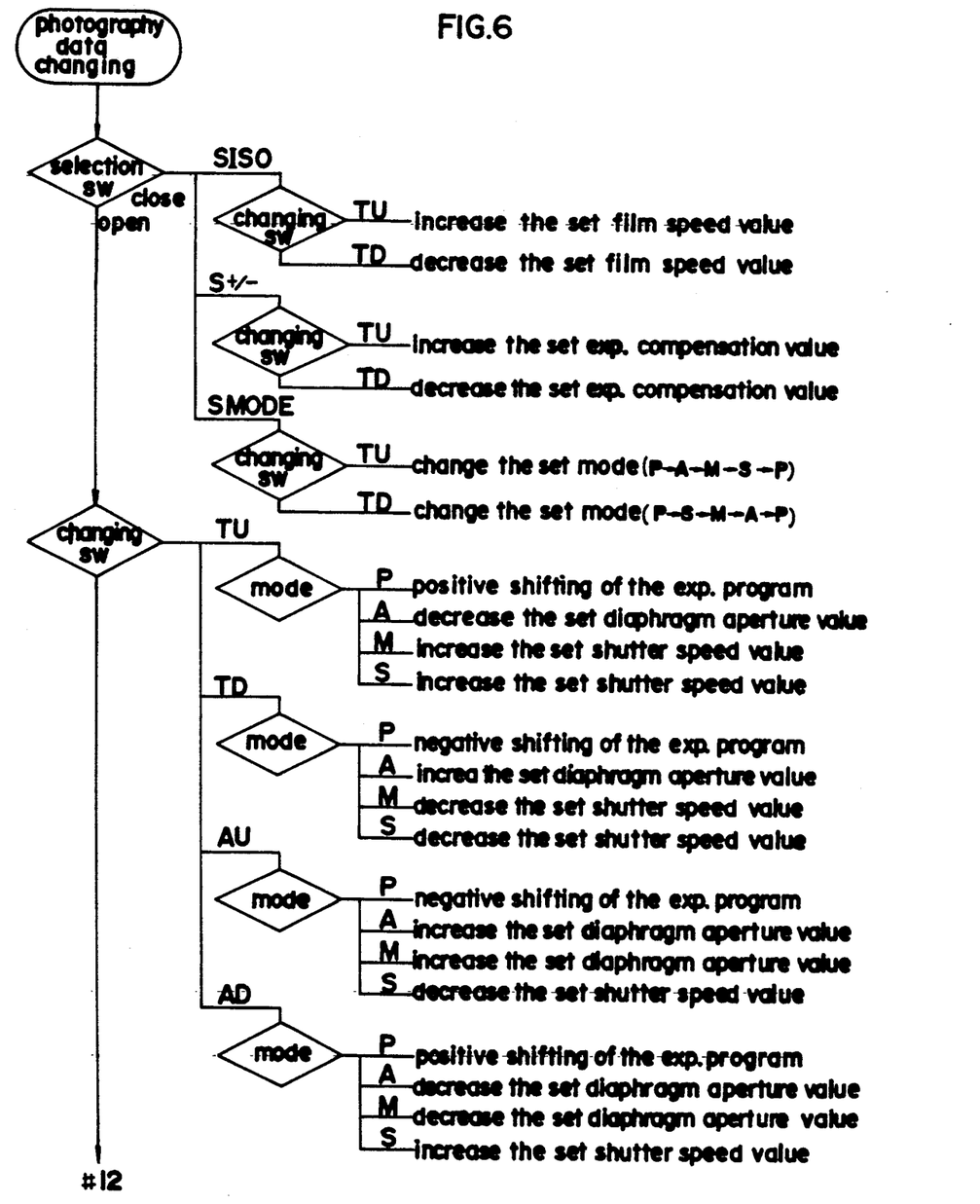
FIG. 6 shows a detailed flow chart at step #11 in FIG. 5.
Figure 7:
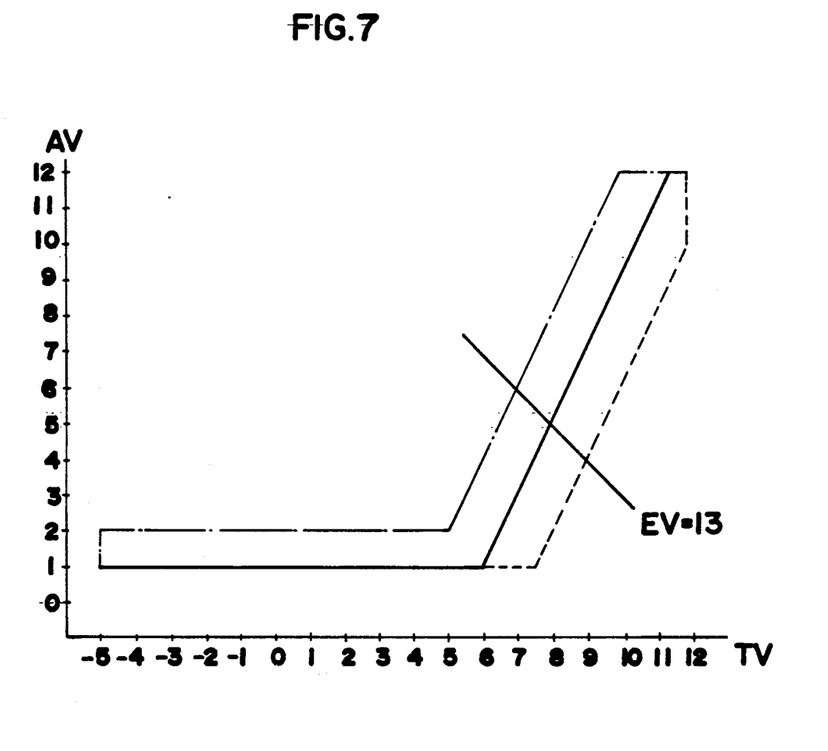
FIG. 7 shows a shifting manner of the program line shown in FIG. 6.

FIG. 6 shows in more detail the operation at step #11. First, it is determined whether the interruption is effected by the closure of any of the switches SISO, S+/− and SMODE or by the closure of the switch S1 or S2. If the interruption is made by the closure of any of the switches SISO, S+/− and SMODE, the data of the film speed, the amount of exposure compensation and exposure control mode can be changed. Those data can be changed only when either of switches STU and STD is closed with any of switches SISO, S+/− and SMODE being closed but neither of switches SAV and SAD being closed. If either of switches SAV and SAD is closed, the data can not be changed. When the interruption is due to the closure of either switch S1 or S2, the data of the amount of the program shifting, the diaphragm aperture value or the shutter speed value can be changed in accordance with the exposure control mode selected from the P, A, M and S modes. Those data are changed when either of switches S1 and S2 are closed with one of the switches STU, STD, SAU and SAD being closed. Explanation will be made hereinbelow about the process of data changing in accordance with the combination of closed switches.

a) In the case where either of switches STU and STD is closed with the switch SISO being closed:

When the switch STU is closed, the potential at the input terminal IP7 drops to a "Low" level. In response to the dropping of the potential, the film speed value e.g. IS0100 set previously is increased by ⅛ step from the value to e.g. IS0125. Thus, the film speed value is increased by ⅛ step with each closure of the switch STU. The film speed value changed in this way is displayed instantaneously. When the switch STD is closed, the potential at the input terminal PI8 drops to a "Low" level. In response to the dropping of the potential, the film speed value is reduced by ⅛ step and the reduction is repeated with the repeated closure of the switch STD. When the switch SISO is opened, the display section 10 displays the indication of an exposure control mode and a diaphragm aperture value and/or a shutter speed value determined on the basis of the film speed value set just before the opening of the switch SISO.

b) In the case where either of switches STU and STD is closed with the switch S+/− being closed:

When the switch STU is closed, the dropping of the potential at the input terminal IP7 causes the amount of the exposure compensation to increase by 0.5 step from a previously set value. The value of the exposure compensation amount is repeatedly increased with the repeated closure of the switch STU. When the switch STD is closed, the dropping of the potential at the terminal IP8 causes the value of the exposure compensation amount to decrease by 0.5 step and the decrease of the value by 0.5 step is repeated with the repeated closure of the switch STD. The value of the exposure compensation amount thus changed is displayed at the display section 10 along with the character + or − indicating that the direction of the change is positive or negative. When the switch S+/− is opened, the display section 10 displays the indication of an exposure control mode and a diaphragm aperture value and/or a shutter speed value determined on the basis of the value of the exposure compensation amount that was set just before the opening of the switch S+/−.

c) In the case when either of switches STU and STD is closed with the switch SMODE being closed: when the switch STU is closed, the dropping of the potential at the input terminal IP7 causes the exposure control mode to change from a previously set mode e.g. the P mode to another mode, e.g. the A mode. Repeated closure of the switch STU causes sequential and cyclic change of the exposure control mode in the order of P→ A→ M→ S→ P mode. When the switch STD is closed, the dropping of the potential at the input terminal IP8 causes the exposure control mode to change reversely, e.g. from P to S mode. The exposure control mode changes sequentially in the order of P → S → M → A → P mode. When the exposure control mode is changed in this way, the display section 10 displays the indication of the changed exposure control mode and a diaphragm aperture value and/or a shutter speed value for that exposure control mode.

d) In the case where the switch S1 or S2 is closed in the P mode condition with any of switches STU, STD, SAU and SAD being closed:

When either switch STU or SAD is closed, the exposure control program is changed such that the shutter speed value is increased by ⅛ step and the diaphragm aperture value is reduced by ⅛ step from the values determined by the program just before the operation of the switch resulting in parallel shifting of the program line representing the exposure program. It is to be noted that the above shifting is referred to as +1 step program shift or program shift of +1 step while a shifting of the exposure program to reduce the shutter speed value by ⅛ step and increase the diaphragm aperture value by ⅛ step is referred to as −1 step program shift or program shift of −1 step. When the closure of the switch STU or SAD is repeated, the program is changed to shift the program line parallelly by +1 step at each closure of the switch. When the switch STD or SAU is closed, the program is changed to shift the program line parallelly by −1 step. The repeated closure of the switch STD or SAU causes the program line to shift by −1 step at each closure of the switch. FIG. 7 shows how the program line is shifted. In the FIG., the solid line represents a most popular program which is set in the circuit by the initialization at step #2 and which has not been shifted, i.e. has the amount 0 of shifting. The broken line is a program line for the program shifted by +2 steps from the zero shift condition by, for example, the closure of the switch STU two times. The chain dot line is a program line for the program shifted by −2 steps from the zero shift condition by, for example, the closure of the switch STD two times. When the amount of the program shifting is changed, the display section 10 displays the indication of P mode and a diaphragm aperture value and a shutter speed value determined in accordance with the new program represented by the shifted program line. In this case, the indication of the P mode is intermittently driven to blink.

e) In the case where the switch S1 or S2 is closed at the A mode with one of the switches STU, STD, SAU and SAD being closed:

When the switch SAU or STD is closed, the diagram aperture value is increased by ⅛ step from the previously set value, for example, from F2 to F2.4 and is repeatedly increased by ⅛ step with the repeated closure of the switch SAU or ATD. When the switch SAD or STU is closed, the diaphragm aperture value is reduced by ½ step from the previously set value and is repeatedly reduced by ½ step with the repeated closure of the switch SAD or STU. When the diaphragm aperture value is changed in this way, the display section 10 displays the indication of the A mode and the changed diaphragm aperture value and a shutter speed value determined on the basis of changed aperture value.

f) In the case where the switch S1 or S2 is closed at the M mode with one of switches STU, STD, SAU and STD being closed:

When the switch SAU is closed, the diaphragm aperture value is increased by ½ step from a previously set value and is repeatedly increased by ½ step with repeated closure of the switch SAU. When the switch SAD is closed, the diaphragm aperture value is reduced by ½ step from a previously set value and is repeatedly reduced by ½ step with repeated closure of the switch SAD. When the switch STU is closed, the shutter speed value is increased by one step from a previously set value, e.g. from 1/250 sec to 1/500 and is repeatedly increased by one step with repeated closure of the switch STU. When the switch STD is closed, the shutter speed value is reduced by one step from a previously set value and is repeatedly reduced by one step with repeated closure of the switch STD. The display section 10 displays the indication of the M mode and the diaphragm aperture and shutter speed values thus set with the switches STU, STD, SAU and SAT.

g) In the case where the switch S1 or S2 is closed at the S mode with one of the switches STU, STD, SAU and SAD being closed:

When the switch STU or SAD is closed, the shutter speed value is increased by one step from a previously set value and is repeatedly increased by one step with repeated closure of the switch STU or SAD. When the switch STD or SAU is closed, the shutter speed value is reduced by one step from a previously set value and is repeatedly reduced by one step with repeated closure of the switch STD or SAU. The display section 10 displays the indication of the S mode and the shutter speed value set as mentioned above as well as a diaphragm aperture value determined on the basis of the set shutter speed value.

As described before, the switches STU and SAU are manually operated mainly to increase respectively the shutter speed and diaphragm aperture value, while the switches STD and SAD are manually operated mainly to reduce respectively the shutter speed and diaphragm aperture value. As seen in the cases of above described d), e) and g), the directions of the program shift and of the changes of the shutter speed and diaphragm aperture values are opposite when the switches STU and STD and operated and when the switches SAU and SAD are operated. For example, the switch STU for increasing the shutter speed in S and M modes, is operated to reduce the diaphragm aperture value in A mode. This is for the following reason. In the automatic exposure control modes such as the P, A and S modes, the shutter speed value and/or the diaphragm aperture value is automatically calculated on the basis of a film sensitivity and a light measurement value. At this time, the shutter speed value and the diaphragm aperture value are in a complementary relationship wherein increase of one of them causes decrease of the other by the same amount. Accordingly, in the cases of d) for the P mode, e) for the A mode and g) for the S mode, the operation of the switch STU and the operation of the switch SAD both perform the same function in causing increase of the shutter speed value and decrease of the diaphragm aperture value. In the same sense, the operation of the switch STD and the operation of the switch SAU perform the same function in causing the decrease of the shutter speed and the increase of the diaphragm aperture value in the cases of d) for the P mode, e) for the A mode and g) for the S mode. Thus, in the cases of d) through g), the operation of the switches STU and STD, actuated by pushbuttons 16 and 17 located about the position of a shutter dial on conventional cameras, causes respectively the increase and decrease of the shutter speed and the operation of the switches SAU and SAD, actuated by pushbuttons 18 and 19 located about the position of a diaphragm aperture setting ring on conventional cameras, causes respectively the increase and decrease of the diaphragm aperture value. In other words, pushbuttons 16, 17, 18 and 19 function to change the same exposure parameter in the same direction, thereby providing convenience of operation and avoiding confusion in operation. As seen in the above, operation of either pair of switches STU and STD and SAU and SAD causes the change of the shutter speed value or the diaphragm aperture value in the P, A and S modes, thereby providing convenience of operation. Additionally, as the switches STU and STD are located around the area where a shutter speed setting dial would be located in conventional cameras and the switches SAU and SAD are located around the area where a diaphragm setting ring would be located in the conventional cameras, those switches can be operated without a strange feeling by the user who has been accustomed to the operation of conventional cameras.

The above described flow was designed such that when the switch S1 or S2 is opened at the time of changing of the data of the shutter speed, the diaphragm aperture value and the program shifting amount, the operations of the data changing, exposure calculation and display are inhibited and the operation of the microcomputer returns back to step #6 wherein the operation is stopped. However, the flow may be modified such that the operations of the data changing, exposure calculation and display, or the operations of the exposure calculation and display, are maintained for a given time after the opening of the switch S1.

With reference to FIG. 4, a switch SDP is parallelly connected with the power-on clear circuit. The switch SDP is closed by the operation of the reset pushbutton 12 when the user wishes to take a picture of a proper exposure urgently in the situation where the above-mentioned switches have been operated to change and-/or set photography data at the step #11 and the photography data are such as to provide an exposure deviated from the proper exposure, for example, in the case where the set exposure compensation amount is not zero or where an arbitrary exposure condition is set in the M mode. When the switch SDP is closed, the potential at the clear terminal $\overline{CLR}$ of the microcomputer MC is made a "Low" level so that the microcomputer MC performs the operation of the steps #1 through #5. With this operation, the camera photography data are automatically initialized so that the exposure control mode is set to the P mode, and that the exposure compensation amount and the amount of the program shifting are respectively made zero with the film speed set to the most common value ISO100 or the value read by the film data reading section FD. Accordingly, if the switch SDP is closed momentarily, preparation for proper exposure photography is completed so that the user will not lose the shutter actuation opportunity. The switch SDP may be closed to change the photography data that have been set. In such a case, the switch SDP is effective especially when the set photography data are significantly changed from the initialized values or conditions. Further, if the user is not accustomed to the operation of the camera and has forgotten or become confused with the manner of the operation while operating a camera, he or she may only operate the reset pushbutton 12 to set the camera such that a proper exposure is obtained.

Figure 8:
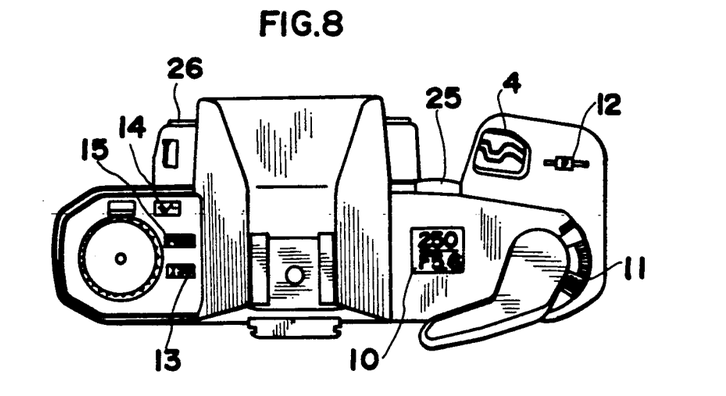
FIG. 8 is a top plan view of a second example of a camera.
Figure 9:
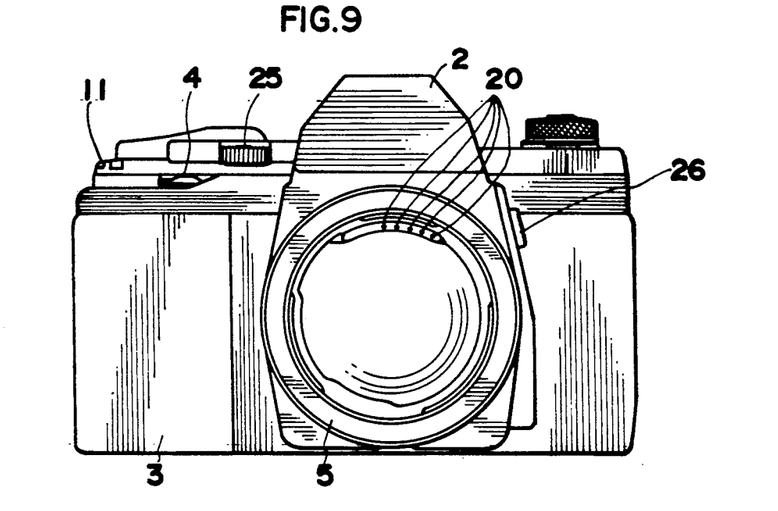
FIG. 9 is a front elevational view of the camera shown in FIG. 8.
Figure 10:
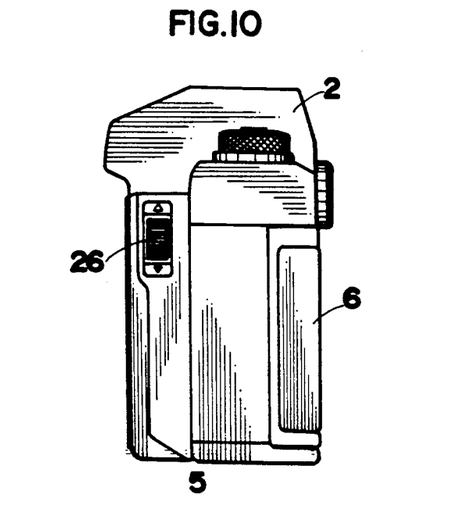
FIG. 10 is a right side view of the camera shown in FIG. 8.

Although all the members for setting the photography data are composed of push buttons in the above described embodiment, the pushbuttons may be replaced by slide switches. FIGS. 8 through 10 show an outer appearance of a second embodiment of a camera which is provided with slide switches partially in place of the pushbuttons. With reference to the FIGS, a switch member 25 corresponds to the changing pushbuttons 16 and 17 in FIG. 1 and is manually and selectively settable to a neutral or intermediate position and left and right side positions. When the switch member 25 is at the neutral position, both switches STU and STD in FIG. 4 are open. When the switch member is at the right side position as viewed from the front of the camera, the switch STD is closed, while the switch STU is closed with the switch member 25 at the left side position. A switch member 26 corresponds to the changing pushbuttons 18 and 19 in FIG. 1 and is manually and selectively set to a neutral position and upper and lower positions. When the switch member 26 is at the neutral position, both switches SAU and SAD are open. The switch SAU is closed with the switch member 26 at the upper position, while the switch SAD is closed with the switch member 26 at the lower position. Those switch members 25 and 26 are urged by springs (not shown) towards the neutral position. As the circuit and its operation of the camera shown in FIGS. 8 through 10 has substantially the same construction as that of the aforementioned first embodiment it is not described here.

Figure 11:
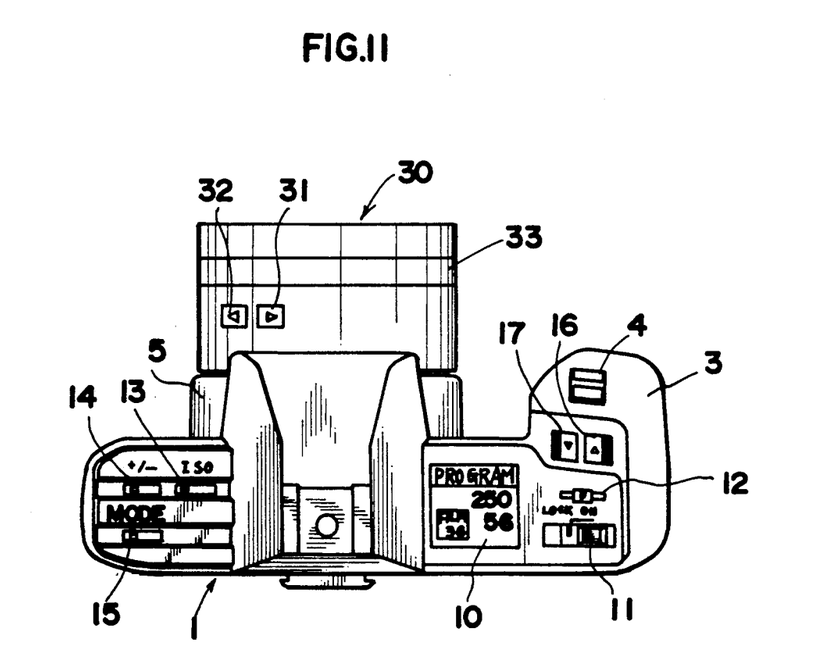
FIG. 11 is a top plan view of a third example of a camera.

FIG. 11 shows a top plan view of a third embodiment of a camera wherein the second pair of changing pushbuttons 31 an 32 are provided on the lens barrel of an exchangeable lens 30 in place of on the side wall of the lens-supporting mount shown in FIG. 1. With reference to the FIG., the lens 30 is provided with the changing pushbuttons 31 and 32 and a focus adjusting ring 33. The pushbuttons 31 and 32 respectively correspond to the pushbuttons 18 and 19 in FIG. 1 and are located at the upper left portion of the lens 30 with respect to the optical axis of the lens, as viewed from the back of the camera. As the circuit and its operation of the camera shown in FIG. 11 has substantially the same construction as that of the aforementioned first embodiment it is not described here.

The above and other related objects and features of the invention will be apparent from a reading of the following description of the disclosure found in the accompanying drawings and the novelty thereof pointed out in the appended claims.

What is claimed is:

1. A camera data setting device for use in a camera which is operable selectively in a diaphragm aperture priority automatic exposure control mode, an exposure time priority automatic exposure control mode and a manual exposure control mode, said device comprising: first and second manual means located at different positions on the camera and manually operable for generating first and second data changing signals, respectively;

selection means for selecting an exposure control mode from said diaphragm aperture priority, exposure time priority and manual exposure control modes; and a data changing means for changing the diaphragm aperture value and the exposure time value in response to the data changing signals, said data changing means including means for changing the exposure time value in response to either of said first and second data changing signals with the exposure time priority mode being selected, and in response to said first data changing signal with the manual exposure control mode being selected, and means for changing the diaphragm aperture value in response to either of the first and second signals with the diaphragm aperture priority mode being selected, and in response to the second data changing signal with the manual exposure control mode being selected.

2. A camera data setting device as in claim 1, wherein said first manual means includes first and second operable means manually operable for generating first and second instruction signals, said second manual means includes third and fourth operable means manually operable for generating third and fourth instruction signals, said means for changing the exposure time includes a first incrementing means for incrementing the exposure time value in response to the first instruction signal in the exposure time priority and manual exposure control modes and in response to the fourth instruction signal in the exposure time priority exposure control mode, and a first decrementing means for decrementing the exposure time value in response to the second instruction signal in the exposure time priority and manual exposure control modes and in response to the third instruction signal in the exposure time priority mode, and said means for changing the diaphragm aperture value includes means for incrementing the diaphragm aperture value in response to the third instruction signal in the diaphragm aperture priority and manual exposure control modes and in response to the second instruction signal in the diaphragm aperture priority exposure control mode, and a second decrementing means for decrementing the diaphragm aperture value in response to the fourth instruction signal in the diaphragm priority and manual exposure control modes and in response to the first instruction signal in the diaphragm aperture priority exposure control mode.

3. A camera data setting device as in claim 2 wherein said camera is adapted to be held with one hand of the user grasping one side of the camera and the other hand supporting the lens barrel of the camera objective lens, said first operable means includes a first switch and a first manual member manually operable for closing said first switch and producing said first instruction signal, said second operable means includes a second switch and second manual member manually operable for closing the second switch and producing said second instruction signal, said third operable means includes a third switch and a third manual member operable for closing the third switch and producing said third instruction signal, and said fourth operable means includes a fourth switch and a fourth manual member manually operable for closing the fourth switch and producing said fourth signal, said first and second manual members being located within the reach of a finger of the camera-holding hand and said third and fourth manual members being located within the reach of at least one of the thumb and a finger of the lens-supporting hand.

4. A camera data setting device as in claim 3 wherein said first, second, third and fourth manual member each have the form of a pushbutton.

5. A camera data setting device as in claim 1, wherein said camera is adapted to be held with one hand of the user grasping one side of the camera and the other hand supporting the lens barrel of the camera objective lens, said first manual means includes a first operation means manually operable and located with the reach of a finger of the camera-holding hand and said second manual means includes a second operation means manually operable and located with a reach of the thumb or a finger of the lens-supporting hand.

6. A camera data setting device as in claim 1, wherein said first manual means includes first and second switches and a first operation means normally positioned at a neutral position and manually shiftable for closing said first and second switches and producing first and second instruction signals respectively, and said second manual means includes third and fourth switches and a second operation means normally positioned at a neutral position and manually shiftable for closing said third and fourth switches and producing third and fourth instruction signals respectively, said means for changing the exposure time includes a first incrementing means for incrementing the exposure time value in response to the first instruction signal in the exposure time priority and manual exposure control modes and in response to the fourth instruction signal in the exposure time priority exposure control mode, and a first decrementing means for decrementing the exposure time value in response to the second instruction signal in the exposure time priority and manual exposure control modes and in response to the third instruction signal in the exposure time priority mode, and said means for changing the diaphragm aperture value includes a second incrementing means for incrementing the diaphragm aperture value in response to the third instruction signal in the diaphragm aperture priority and manual exposure control modes and in response to the second instruction signal in the diaphragm aperture time priority exposure control mode, and a second decrementing means for decrementing the diaphragm aperture value in response to the fourth instruction signal in the diaphragm aperture priority and manual exposure control modes in response to the first instruction signal in the diaphragm aperture priority exposure control mode.

7. In a camera including a camera body having a lens mount on which an interchangeable objective lens with a lens barrel is detachably mounted, said camera being adapted to be held with one hand of the user grasping one side of the camera and the other hand supporting the lens barrel of the objective lens, said camera body comprising:
- a first manual means manually operable for generating a first signal and located within the reach of the thumb or a finger of the camera-holding hand;
- a second manual means including a button manually operable for generating a second signal and located within the reach of the thumb or a finger of the lens-supporting hand;
- a third manual means manually operable for generating a data designating signal which designates one of a plurality of photography data to be changed by said first manual means;
- a data changing means for changing the photography data and an exposure control data which is no designated by said third manual means on the basis of the first and second signals and the data designating signal; and
- a control means for controlling the data change of said data changing means such that the first signal contributes to the data change of the exposure control data or the data change of the photography data by the data-designating signal, and the second signal contributes only to the data change of the exposure control data.

8. A camera body as in claim 7, wherein the photography data designated by the data designating signal is data indicating an exposure control mode.

9. A camera body as in claim 7, wherein the photography data designated by the data designating signal is film speed data.

10. A camera data setting device as in claim 7, wherein the photography data designated by the data designating signal is an exposure compensating data.

11. A camera data setting device as in claim 7, wherein said camera is formed with a lens mount protruding from the front plane of the camera body, said objective lens is detachably mountable on the lens mount of the camera body and said second manual means is disposed on the outer side wall of the lens mount at a position opposite from said first manual means with respect to a vertical plane passing through the optical axis of the objective lens.

* * * * *